United States Patent
Lee et al.

(10) Patent No.: US 9,563,596 B2
(45) Date of Patent: Feb. 7, 2017

(54) ELECTRONIC APPARATUS, SYSTEM INCLUDING ELECTRONIC APPARATUS AND RELAY APPARATUS, AND CONTROL METHOD FOR THE SAME

(71) Applicant: SAMSUNG ELECTRONICS CO., LTD., Suwon-si (KR)

(72) Inventors: Jae-young Lee, Wonju-si (KR); Sung-young Ji, Seongnam-si (KR); Seung-dong Yu, Hwaseong-i (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 725 days.

(21) Appl. No.: 13/899,976

(22) Filed: May 22, 2013

(65) Prior Publication Data

US 2013/0318265 A1 Nov. 28, 2013

(30) Foreign Application Priority Data

May 22, 2012 (KR) .......................... 10-2012-0054321

(51) Int. Cl.
*G06F 13/42* (2006.01)
*H04N 21/436* (2011.01)

(52) U.S. Cl.
CPC ......... *G06F 13/42* (2013.01); *H04N 21/43615* (2013.01)

(58) Field of Classification Search
CPC ...... H04N 5/44; H04L 12/282; H04L 12/2816
See application file for complete search history.

(56) References Cited

U.S. PATENT DOCUMENTS

| | | | | |
|---|---|---|---|---|
| 5,815,297 A | * | 9/1998 | Ciciora | H04B 10/114 340/12.53 |
| 6,469,634 B1 | * | 10/2002 | Williams | F16K 1/36 340/12.22 |
| 6,665,020 B1 | * | 12/2003 | Stahl | H04L 12/40058 348/552 |
| 6,930,730 B2 | * | 8/2005 | Maxon | H04L 12/2805 340/12.53 |
| 7,782,407 B2 | * | 8/2010 | Hicks | G08C 17/02 348/706 |
| 8,068,183 B2 | * | 11/2011 | Stecyk | H04L 12/2814 348/734 |
| 8,077,263 B2 | * | 12/2011 | Candelore | H04N 5/4403 340/12.29 |
| 8,170,419 B2 | * | 5/2012 | Yong | H04N 5/4403 398/106 |

(Continued)

*Primary Examiner* — Brian Misiura
(74) *Attorney, Agent, or Firm* — Sughrue Mion, PLLC (57) ABSTRACT

An electronic apparatus controls a peripheral device by using a relay apparatus. The electronic apparatus includes an interface connected to the peripheral device; a communication unit that performs communication with the relay apparatus; a receiver that receives a control signal for controlling the electronic apparatus; and a controller that, when the control signal is received, performs an operation based on the control signal, and controls the communication unit to transmit information about the performed operation and information about the peripheral device to the relay apparatus in order to control the peripheral device to perform an operation that corresponds to the performed operation.

21 Claims, 6 Drawing Sheets

(56) References Cited

U.S. PATENT DOCUMENTS

| | | | |
|---|---|---|---|
| 8,358,364 B2 * | 1/2013 | Saito | G08C 17/00 341/173 |
| 8,411,208 B2 * | 4/2013 | McRae | H04N 5/4401 348/552 |
| 8,896,426 B1 * | 11/2014 | Mui | G08C 19/00 340/10.51 |
| 8,903,563 B2 * | 12/2014 | Park | H04L 12/12 348/734 |
| 9,066,126 B2 * | 6/2015 | Moroney | H04N 21/42207 |
| 2005/0151886 A1 * | 7/2005 | Hirano | G08C 23/04 348/734 |
| 2006/0259930 A1 * | 11/2006 | Rothschild | G11B 27/11 725/81 |
| 2008/0136972 A1 * | 6/2008 | Blankenburg | H04L 12/282 348/734 |
| 2009/0054003 A1 * | 2/2009 | Lee | H04N 5/44582 455/68 |
| 2013/0057465 A1 * | 3/2013 | Lee | G08C 23/04 345/156 |
| 2013/0162913 A1 * | 6/2013 | Ida | H04N 21/42204 348/734 |

* cited by examiner

ELECTRONIC APPARATUS, SYSTEM INCLUDING ELECTRONIC APPARATUS AND RELAY APPARATUS, AND CONTROL METHOD FOR THE SAME

CROSS-REFERENCE TO RELATED APPLICATIONS

This application claims priority from Korean Patent Application No. 2012-0054321 filed May 22, 2012 in the Korean Intellectual Property Office, the disclosure of which is incorporated herein by reference in its entirety.

BACKGROUND

1. Field

Methods and apparatuses consistent with the exemplary embodiments relate to an electronic apparatus, a system including an electronic apparatus and a relay apparatus, and a control method thereof. More particularly, the exemplary embodiments relate to an electronic apparatus that can control peripheral devices by using a relay apparatus, a system including the electronic apparatus and relay apparatus, and a control method thereof.

2. Description of the Related Art

Generally, a remote controller is an apparatus that remotely controls electronic apparatuses such as televisions (TVs), Digital Versatile Disk (DVD) apparatuses, video apparatuses, audio apparatuses, air conditioners, etc. In order to identify electronic apparatuses of a specific manufacturer and electronic apparatuses of other manufacturers, the remote controller emits control codes that are set differently from each of the electronic apparatuses in the form of an infrared signal.

However, since, if many different types of electronic apparatuses are used in a home, a plurality of remote controllers may have to be used to control these different devices. Accordingly, it may be difficult for the users to manage the plurality of remote controllers. Additionally, it may be cumbersome to change the remote controllers whenever the users want to select and use different electronic apparatuses.

Particularly, although a television and a set-top box are used together for broadcast services, separate remote controllers are used to turn on or off the television and set-top box; therefore, the users feel uncomfortable.

Accordingly, there is a need to seek ways that can control a plurality of electronic apparatuses at the same time by easier manipulation.

SUMMARY

The present disclosure has been developed in order to overcome the above drawbacks and other problems associated with the related art arrangement. An aspect of the present disclosure provides an electronic apparatus that can control peripheral devices connected to the electronic apparatus by using a relay apparatus, a system including the electronic apparatus and relay apparatus, and a control method thereof.

The above aspect and/or other features of the present disclosure can substantially be achieved by providing an electronic apparatus that controls at least one peripheral device by using a relay apparatus, the electronic apparatus may include an interface connected to the at least one peripheral device; a communication unit that performs communication with the relay apparatus; a receiver that receives a control signal for controlling the electronic apparatus; and a controller that, when the control signal is received, performs an operation depending on the control signal, and controls the communication unit to transmit information about the performed operation and information about the at least one peripheral device to the relay apparatus in order to control the at least one peripheral device to perform an operation that corresponds to the operation performed by the electronic apparatus.

The interface may include at least one connector that is connected to the at least one peripheral device.

The electronic apparatus may include a storage that stores the information about the peripheral device matched with the at least one connector, wherein, when the control signal is received, the controller controls to transmit the information about the peripheral device matched with the connector to which the peripheral device is connected to the relay apparatus.

The information about the peripheral device may include at least one of a brand name, a model name, and a product serial number of the peripheral device.

The control signal may include a power off command for turning off power of the electronic apparatus, and the controller may turn off the power of the electronic apparatus depending on the power off command, and may control to transmit information about the power off operation that was performed in the electronic apparatus to the relay apparatus in order to turn off the power of the peripheral device through the relay apparatus.

The relay apparatus may generate a control signal for turning off the power of the peripheral device based on the information about the peripheral device and the information about the power off operation, and thus, the relay apparatus may transmit the control signal to the peripheral device.

The control signal may include an external input switch command for outputting an external input signal being received from the peripheral device in the electronic apparatus, and the controller may control to output the external input signal being received from the peripheral device depending on the external input switch command, and may control to transmit information about the external input switch that was performed in the electronic apparatus to the relay apparatus in order to turn on the power of the peripheral device through the relay apparatus.

The relay apparatus may generate a control signal for turning on the power of the peripheral device based on the information about the peripheral device and the information about the external input switch, and thus, the relay apparatus may transmit the control signal to the peripheral device.

According to another aspect of the present disclosure, a control method of an electronic apparatus that controls at least one peripheral device by using a relay apparatus, the control method may include receiving a control signal for controlling the electronic apparatus; after the control signal is received, performing an operation depending on the control signal; and transmitting information about the performed operation and information about the at least one peripheral device to the relay apparatus in order to control the at least one peripheral device to perform an operation that corresponds to the operation performed by the electronic apparatus.

The controller may include at least one connector that is connected to the at least one peripheral device.

The control method may include storing information about the at least one peripheral device matched with the at least one connector, wherein, when the control signal is received, the transmitting information may include determining a connector to which the peripheral device is connected; and transmitting the information about the peripheral device matched with the connector to which the peripheral device is connected to the relay apparatus.

The information about the peripheral device may include at least one of a brand name, a model name, and a product serial number of the peripheral device.

The control signal may include a power off command for turning off the power of the electronic apparatus, the performing an operation may include turning off the power of the electronic apparatus depending on the power off command, and the transmitting information may include transmitting information about the power off operation that was performed in the electronic apparatus to the relay apparatus in order to turn off the power of the peripheral device through the relay apparatus.

The relay apparatus may generate a control signal for turning off the power of the peripheral device based on the information about the peripheral device and the information about the power off operation, and thus, the relay apparatus may transmit the control signal to the peripheral device.

The control signal may include an external input switch command for displaying an external input signal being received from the peripheral device in the electronic apparatus, the performing operation may include outputting the external input signal being input from the peripheral device depending on the external input switch command, and the transmitting information may include transmitting information about the external input switch that was performed in the electronic apparatus to the relay apparatus in order to turn on the power of the peripheral device through the relay apparatus.

The relay apparatus may generate a control signal for turning on the power of the peripheral device based on the information about the peripheral device and the information about the external input switch, and thus, the relay apparatus may transmit the control signal to the peripheral device.

According to another aspect of the present disclosure, a system may include a relay apparatus; and an electronic apparatus that controls a peripheral device by using the relay apparatus, wherein, when a control signal for controlling the electronic apparatus is received, the electronic apparatus performs an operation depending on the control signal, and transmits information about the performed operation and information about the peripheral device to the relay apparatus in order to control the peripheral device to perform an operation that corresponds to the operation performed by the electronic apparatus, and the relay apparatus generates a control signal for controlling an operation of the peripheral device based on the information about the performed operation and the information about the peripheral device, and thus, transmits the control signal to the peripheral device.

When a control signal for turning off power of the electronic apparatus is received, the electronic apparatus may turn off its own power, and transmit information about the power off operation that was performed in the electronic apparatus to the relay apparatus, and the relay apparatus may generate a control signal for turning off power of the peripheral device based on the information about the peripheral device, and thus, may transmit the control signal to the peripheral device.

With an electronic apparatus and a system according to an exemplary embodiment of the present disclosure, since users can at the same time operate the electronic apparatus and a peripheral device more easily, the convenience of the users can be improved.

Other features of the present disclosure will become apparent from the following detailed description, which, taken in conjunction with the annexed drawings, discloses exemplary embodiments.

BRIEF DESCRIPTION OF THE DRAWINGS

These and/or other aspects of the present disclosure will become apparent and more readily appreciated from the following description of the exemplary embodiments, taken in conjunction with the accompanying drawings of which.

Throughout the drawings, like reference numerals will be understood to refer to like parts, components and structures.

DETAILED DESCRIPTION OF THE EXEMPLARY EMBODIMENTS

Hereinafter, certain exemplary embodiments of the present disclosure will be described in detail with reference to the accompanying drawings.

The matters defined herein, such as a detailed construction and elements thereof, are provided to assist in a comprehensive understanding of this description. Thus, it is apparent that the exemplary embodiments may be carried out without those defined matters. Also, well-known functions or constructions are omitted to provide a clear and concise description of exemplary embodiments. Further, dimensions of various elements in the accompanying drawings may be arbitrarily increased or decreased to assist in a comprehensive understanding.

Figure 1:
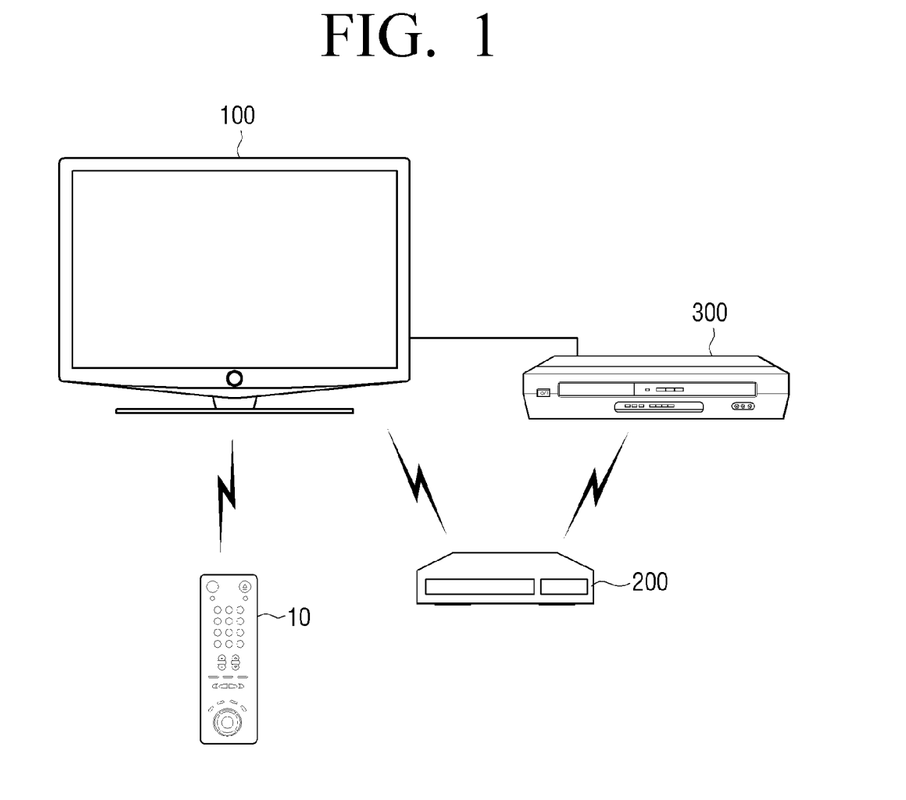
FIG. 1 is a view illustrating a system including a relay apparatus and an electronic apparatus that controls peripheral devices by using the relay apparatus according to an exemplary embodiment of the present disclosure.

FIG. 1 is a view illustrating a system including a relay apparatus and an electronic apparatus that controls peripheral devices using the relay apparatus according to an exemplary embodiment of the present disclosure. Referring to FIG. 1, the system includes a remote control apparatus 10, an electronic apparatus 100, a relay apparatus 200, and a peripheral device 300.

When a control signal for controlling the electronic apparatus 100 is received from the remote control apparatus 10, the electronic apparatus 100 may operate depending on the received control signal.

For example, when a control code corresponding to "a power off command" is received from the remote control apparatus 10, the electronic apparatus 100 can turn off the power, and when a control code corresponding to "a TV channel changing command" is received, the electronic apparatus 100 can change the channel. However, operations of the electronic apparatus 100 are not limited by those. Therefore, the electronic apparatus 100 can perform a variety of operations depending on control signals received from the remote control apparatus 10.

On the other hand, the electronic apparatus 100 may be implemented as a digital TV, a personal computer (PC), a notebook computer, etc. However, the electronic apparatus 100 is not limited by those. Therefore, the electronic apparatus 100 may be implemented as various types of electronic apparatuses that can be operated depending on control signals received from the remote control apparatus 10.

The electronic apparatus 100 may receive control signals from the remote control apparatus 10 through various communication ways. For example, the electronic apparatus 100 may receive the control signal in the form of infrared signals from the remote control apparatus 10, or may perform communication with the remote control apparatus 10 depending on a variety of communication ways such as Bluetooth, Wi-Fi, etc. to receive the control signal.

Also, the electronic apparatus 100 may control operations of the peripheral device 300 by using the relay apparatus 200. In detail, the electronic apparatus 100 may control the operation of the peripheral device 300 to perform operations that correspond to the operations performed in the electronic apparatus 100.

For example, when the power of the electronic apparatus 100 is turned off, the electronic apparatus 100 may turn off the power of the peripheral device 300 through the relay apparatus 200. As another example, when the electronic apparatus 100 wants to output a signal that is to be received from the peripheral device 300, the electronic apparatus 100 may turn on the power of the peripheral device 300 through the relay apparatus 200.

The relay apparatus 200 may generate control signals for controlling the peripheral device 300 based on information received from the electronic apparatus 100.

In detail, based on operation information received from the electronic apparatus 100, and a brand name, a model name, and a product serial number of the peripheral device 300 that the electronic apparatus 100 wants to control, the relay apparatus 200 may generate a control signal for controlling the peripheral device 300 to perform operations that correspond to the operations performed in the electronic apparatus 100. For this, the relay apparatus 200 may create and store a database of control codes that can control the peripheral device 300 according to various brand names, model names, or product serial numbers of the peripheral device 300.

For example, when information that the power of the electronic apparatus 100 is turned off and model name information of the peripheral device 300 that it wants to control are received, the relay apparatus 200 may detect a control code that can turn off the power of the peripheral device 300 depending on the model name of the peripheral device 300 from the database.

As another example, when the relay apparatus 200 receives information that the electronic apparatus 100 outputs an external input signal output from the peripheral device 300 and the model name information of the peripheral device 300, the relay apparatus 200 may detect a control code that can turn on the power of the peripheral device 300 depending on the model name of the peripheral device 300 from the database.

The relay apparatus 200 may transmit the generated control signal to the peripheral device 300. For example, the relay apparatus 200 may transmit the control code that is detected based on information about the operation performed in the electronic apparatus 100 and the peripheral device 300 to the peripheral device 300 in a form of an infrared signal. However, the relay apparatus 200 is not limited by that. Therefore, the relay apparatus 200 may transmit the control signal to the peripheral device 300 by a variety of wireless communication ways such as Bluetooth, Wi-Fi, etc.

The peripheral device 300 may perform an operation depending on the control signal received from the relay apparatus 200. In detail, the peripheral device 300 has a infrared receiver (not illustrated) so as to receive the control codes in the form of infrared, and may perform various operations, such as power on, power off, etc., based on the received control codes. However, the peripheral device 300 is not limited by that. Therefore, the peripheral device 300 may have a Bluetooth communication module (not illustrated), a Wi-Fi communication module (not illustrated), etc. so as to perform communications with the relay apparatus 200, thereby receiving the control codes.

On the other hand, the peripheral device 300 may be implemented as a set-top-box (STB), a home theater system (HTS), a Blu-ray disc player (BDP), a DVD player (DVDP), a HDD recorder (HDDR), a portable multimedia player (PMP), etc.

Figure 2:
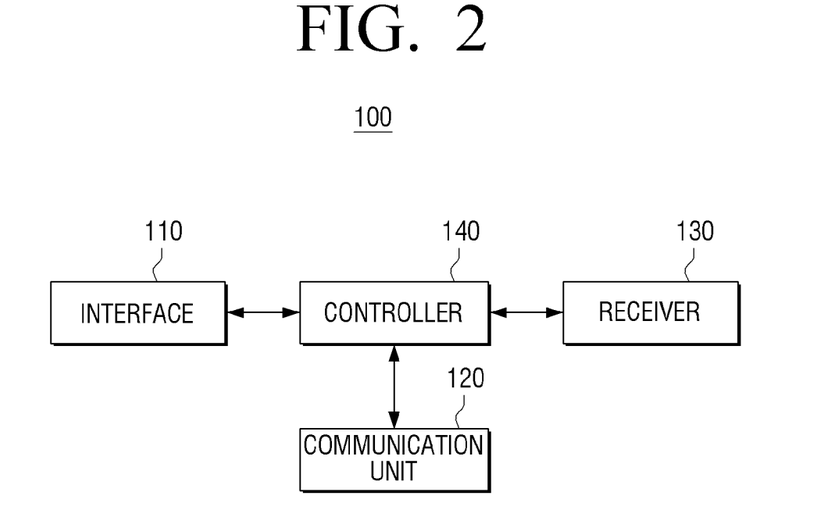
FIG. 2 is a block diagram for explaining configuration of an electronic apparatus according to an exemplary embodiment of the present disclosure.

FIG. 2 is a block diagram for illustrating the configuration of an electronic apparatus according to an exemplary embodiment of the present disclosure. Referring to FIG. 2, the electronic apparatus 100 may include an interface 110, a communication unit 120, a receiver 130, and a controller 140.

The interface 110 is connected to the peripheral device. In detail, the interface 110 may include at least one connector to be connected to at least one peripheral device. The connector may be implemented as a D-sub, a DVI, a component, an S-video, etc., and may receive a video signal, an audio signal, etc. from the peripheral device.

The communication unit 120 performs communication with the relay apparatus 200. In detail, the communication unit 120 may perform communication with the relay apparatus through a variety of wireless communication ways. For this, the communication unit 120 may include an infrared transmission unit, a Bluetooth communication module, a Wi-Fi communication module, etc.

The receiver 130 receives control signals for controlling the electronic apparatus 100. In detail, the receiver 130 may receive the control signals for controlling a variety of operations that can be performed in the electronic apparatus 100 such as a power off command, a power on command, an external input switch command, a volume adjust command, a channel change command, etc. For these, the receiver 130 may include an infrared receiver, a Bluetooth communication module, a Wi-Fi communication module, etc.

The controller 140 controls overall operations of the electronic apparatus 100. Particularly, when the control signal is received, the controller 140 may perform an operation depending on the control signal and may control the communication unit 120 to transmit information about the performed operation and information about the peripheral device to the relay apparatus in order to control the peripheral device to perform operations that correspond to the operations performed by the electronic apparatus.

Here, the information about the operations performed in the electronic apparatus 100 may include information about a variety of operations, such as power on, power off, external input switch, etc., that were performed in the electronic apparatus 100 depending on the control signals. The information about the peripheral device may include at least one of a brand name, a model name, and a product serial number of the peripheral device.

In detail, if the control signal includes a power off command for turning off the power of the electronic apparatus, the controller 140 turns off the power of the electronic apparatus 100 depending on the power off command, and, in order to turn off the power of the peripheral device through the relay apparatus, the controller 140 may control to transmit information about the power off operation performed in the electronic apparatus to the relay apparatus.

In other words, if a control code corresponding to the power off command is received from the remote control apparatus, the controller 140 shuts off an external power being supplied to each configuration of the electronic apparatus 100, thereby turning off the power of the electronic apparatus 100. Then, the controller 140 may control to transmit information indicating that the power of the electronic apparatus 100 was turned off, and at least one of a brand name, a model name, and a product serial number of the peripheral device connected to a connector through which an external input signal is being received to the relay apparatus. Here, the external input signal is a signal that is input from the peripheral device connected to the electronic apparatus 100, and may include at least one of a video signal and an audio signal.

Also, if the control signal includes an external input switch command for outputting a signal being received from the peripheral device, the controller 140 may control to output the external input signal being input from the peripheral device depending on the external input switch command, and to transmit information about the external input switch that was performed in the electronic apparatus to the relay apparatus in order to turn on the power of the peripheral device through the relay apparatus.

In other words, if a control code corresponding to the external input switch command is received from the remote control apparatus, the controller 140 may output the external input signal being received from the peripheral device. Then, the controller 140 may control to transmit information that the external input switch was performed and at least one of a brand name, a model name, and a product serial number of the peripheral device connected to the connector that was selected depending on the external input switch command to the relay apparatus.

On the other hand, the electronic apparatus 100 may have previously stored information about each of peripheral devices matched with each of the connectors. In other words, the electronic apparatus 100 may previously match and store the brand name, model name, and product serial number of each of the peripheral devices connected to the connectors with each of the connectors.

In other words, when turning off the power after receiving the power off command, the controller 140 may determine through which connector the external input signal is being input, may detect the information about the peripheral device that is matched with the connector through which the external input signal is being input and is previously stored, and may control to transmit the information to the relay apparatus. Also, when the external input switch command is received, the controller 140 may determine which connector is selected depending on the external input switch command, may detect the information about the peripheral device that is matched with the connector and is previously stored, and may control to transmit the information to the relay apparatus.

Figure 3:
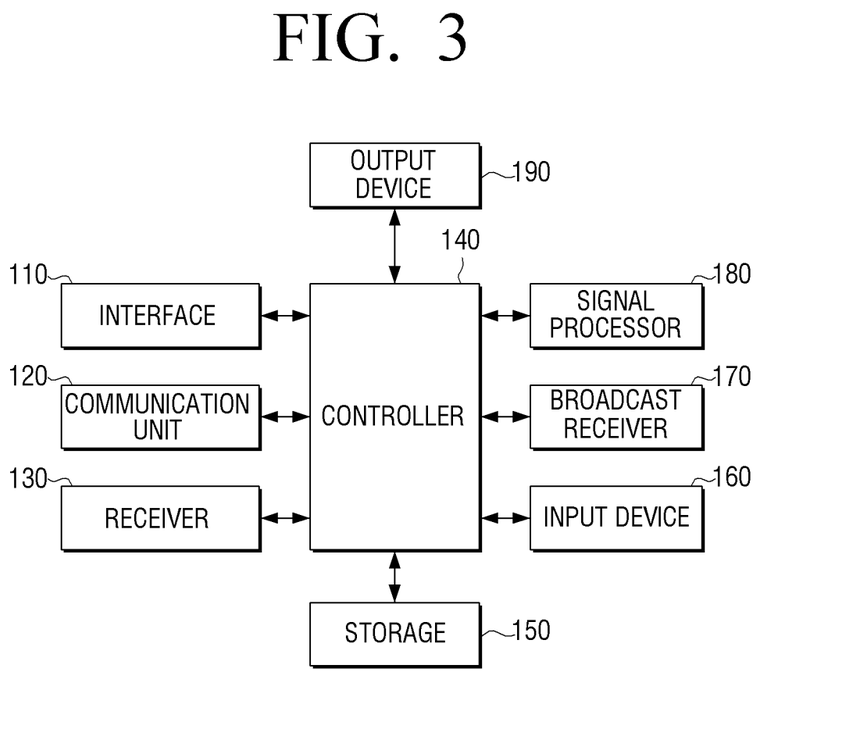
FIG. 3 is a block diagram for explaining detailed configuration of an electronic apparatus according to an exemplary embodiment of the present disclosure.

FIG. 3 is a block diagram for explaining the configuration of an electronic apparatus according to an exemplary embodiment of the present disclosure. Particularly, FIG. 3 is a view for explaining the configuration of an electronic apparatus 100 that is implemented as a broadcast receiving apparatus, and includes an interface 110, a communication unit 120, a receiver 130, a controller 140, a storage 150, an input device 160, a broadcast receiver 170, a signal processor 180, and an output device 190. In the description of FIG. 3, since components having the same reference numbers of those of FIG. 2 perform the same functions, detailed duplicate description thereof will be omitted.

The storage 150 is a storage medium in which a variety of programs required for operating the electronic apparatus 100 are stored, and may be implemented as a memory, a hard disk drive (HDD), etc.

Particularly, the storage 150 may store the information about each of the peripheral devices matched with each of the connectors. In other words, the storage 150 may previously match at least one of a brand name, a model name, and a product serial number of the peripheral device connected to each of the connectors with each of the connectors, and thus, may store the result therein. For example, it is assumed that a BDP is connected to a D-sub connector provided in the electronic apparatus 100, and a DVDP is connected to a DVI connector thereof. In this case, the storage 150 matches at least one of a brand name, a model name, and a product serial number of the BDP with the D-sub connector, and thus, stores the result therein. Also, the storage 150 matches at least one of a brand name, a model name, and a product serial number of the DVDP with the DVI connector, and thus, stores the result therein.

On the other hand, when a control signal is received, the controller 140 may control to transmit the information about the peripheral device matched with the connector connected to the peripheral device to the relay apparatus.

For example, when the power off command is received, the controller 140 may control to transmit at least one of the brand name, model name, and product serial number of the peripheral device connected to the connector through which the external input signal is being input to the relay apparatus. As another example, when the external input switch command is received, the controller 140 may control to transmit at least one of the brand name, model name, and product serial number of the peripheral device connected to the connector which is selected depending on the external input switch command to the relay apparatus.

The input device 160 is an input member that receives a variety of user operations and then transfers them to the controller 140, and may be implemented as an input panel. Here, the input panel may be formed as a touch pad, a key pad having various function keys, number keys, special keys, character keys, etc., or a touch screen, but is not limited thereto.

Particularly, the input device 160 may receive information about the peripheral devices. In other words, a user can input the brand name, the model name, and the product serial number of the peripheral device connected to each of the connectors through the key pad or a virtual keyboard provided on the touch screen.

In addition, the information about the peripheral devices may be input through the receiver 130. If the user selects a number or a character through a key pad or a touch screen provided in the remote control apparatus, the remote control apparatus transmits a control code corresponding to the selected number or character to the electronic apparatus 100. Accordingly, the receiver 130 may receive the brand name, the model name, and the product serial number of the peripheral device connected to each of the connectors.

The broadcast receiver 170 receives and demodulates broadcast signals from broadcast stations or satellites. For this, the broadcast receiver 170 may include configurations such as a tuner (not illustrated), a demodulator (not illustrated), an equalizer (not illustrated), etc.

The signal processor 180 performs signal processing on the broadcast signals received through the broadcast receiver 170. In detail, the signal processor 180 separates the broadcast signal that is received through the broadcast receiver 170 into audio signals and video signals, and performs signal processing of video decoding, video scaling, audio decoding, etc. with respect to the video and audio signals, thereby processing them in the form that can be output in the output device 190.

Similarly, the signal processor 180 performs signal processing with respect to the external input signal received through the interface 110. In other words, the signal processor 180 performs signal processing of video decoding, video scaling, audio decoding, etc. with respect to the video and audio signals that are received through the interface 110, thereby processing them in the form that can be output in the output device 190.

The output device 190 includes a display (not illustrated) and a speaker (not illustrated), and may output the broadcast signal and the external input signal. However, the output device is not limited thereto.

In detail, the display (not illustrated) displays the signal processed video signal. For this, the display (not illustrated) may be implemented as a liquid crystal display (LCD), an organic light emitting display (OLED), a plasma display panel (PDP), etc.

On the other hand, the speaker (not illustrated) outputs the signal processed audio signals. In detail, the speaker (not illustrated) may amplify the audio signal transmitted from the signal processor 180, and thus, may provide it to the user. An exemplary embodiment in which the audio signal is output through the speaker (not illustrated) is explained in the above-description; however, the output device 190 may include an output port, etc. such as a jack, etc.

Figure 4:
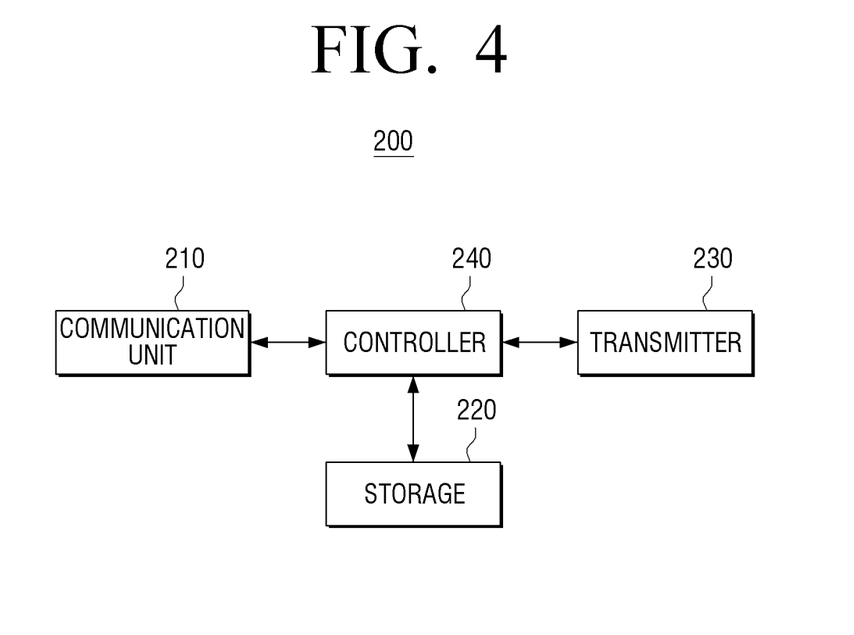
FIG. 4 is a block diagram for explaining configuration of a relay apparatus according to an exemplary embodiment of the present disclosure.

FIG. 4 is a block diagram for explaining the configuration of a relay apparatus according to an exemplary embodiment of the present disclosure. Referring to FIG. 4, the relay apparatus 200 includes a communication unit 210, a storage 220, a transmitter 230, and a controller 240. Particularly, the relay apparatus 200 may be implemented as an infrared (IR) blaster interfacing between the electronic apparatus and the peripheral devices.

The communication unit 210 performs communication with the electronic apparatus according to a variety of wireless communication ways. For this, the communication unit 210 may include an infrared receiver, a Bluetooth communication module, a Wi-Fi communication module, etc.

In detail, the communication unit 210 may receive the information about the operation that was performed in the electronic apparatus and the information about the peripheral devices from the electronic apparatus. Here, the information about the operation that was performed in the electronic apparatus means information indicating the operation that was performed in the electronic apparatus according to functions such as power off, power on, external input switch, etc. The information about the peripheral device may include at least one of the brand name, the model name, and the product serial number of the peripheral device.

The storage 220 is a storage medium in which a variety of programs required for operating the relay apparatus 200 are stored, and may be implemented as a memory, a hard disk drive (HDD), etc.

Particularly, the storage 220 may have stored control codes that can control each of the peripheral devices based on information about the peripheral devices. In detail, the storage 220 may create and store a database of control codes that can control the peripheral device by each of a variety of brand names, model names, and product serial numbers of the peripheral devices.

The transmitter 230 transmits the control signal to control the peripheral device to the peripheral device. In detail, the transmitter 230 has an infrared transmitter, and may transmit the control code for controlling the peripheral device to the peripheral device in the form of infrared signals. However, the transmitter 230 is not limited by this. Therefore, the transmitter 230 may have the Bluetooth communication module and the Wi-Fi communication module, and may transmit the control signal to the peripheral device according to each of the communication ways.

The controller 240 controls overall operations of the relay apparatus 200. Particularly, when information about the operation that was performed in the electronic apparatus and information about the peripheral device are received, the controller 240 may generate a control signal for controlling the peripheral device based on the received information, and may transmit the generated control signal to the peripheral device.

In detail, the controller 240 may generate the control signal for controlling the peripheral device to perform an operation that corresponds to the operation that was performed in the electronic apparatus by using at least one of the brand name, model name, and product serial number of the peripheral device.

For example, based on the information about the peripheral device and the power off operation information, the controller 240 generates a control signal to turn off the power of the peripheral device, and thus, transmits the control signal to the peripheral device. In other words, when the power of the electronic apparatus is turned off, the controller 240 may detect a control code for turning off the power of the corresponding peripheral device from the storage 220 based on the received at least one of brand name, model name, and product serial number of the peripheral device.

Also, the controller 240 may generate a control signal to turn on the power of the peripheral device based on the information about the peripheral device and the external input switch information, and thus, may transmit the control signal to the peripheral device. In other words, when the external input switch signal is input from the electronic apparatus, the controller 240 may detect a control code for turning on the power of the corresponding peripheral device from the storage 220 based on the received at least one of the brand name, model name, and product serial number of the peripheral device.

The controller 240 may control the transmitter 230 to transmit the control code detected from the storage 220 to the peripheral device by using a variety of communication ways. In detail, the controller 240 may control an infrared transmitter (not illustrated) to transmit the control code to the peripheral device in the infrared way. However, the controller 240 is not limited by that; therefore, the controller 240 may have a Bluetooth communication module, a Wi-Fi communication module, etc., and may transmit the control code to the peripheral device according to a variety of wireless communication ways.

Figure 5:
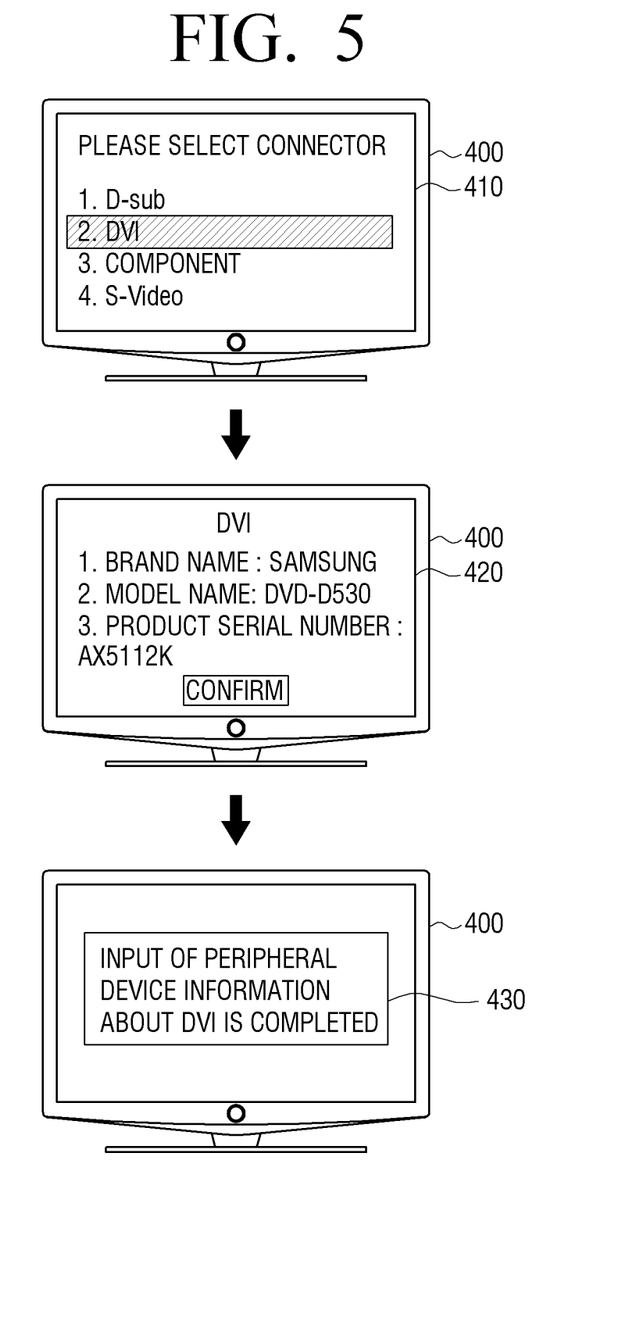
FIG. 5 is a view for explaining a method for setting each of peripheral devices by each of connectors in an electronic apparatus according to an exemplary embodiment of the present disclosure.

FIG. 5 is a view for explaining a method for setting each of the connected peripheral devices by each of the connectors in an electronic apparatus according to an exemplary embodiment of the present disclosure. For the convenience of description, FIG. 3 will be referred to with FIG. 5.

When a user operation for inputting information about the peripheral device is input through the input device 160, the controller 140 displays a list of the connectors provided in the electronic apparatus 100 on the output device 190. Then, after one connector of the list is selected by the user, the controller 140 displays a user interface (UI) window in which information about a peripheral device that is connected to, or will be connected to, the selected connector can be input on the output device 190. Then, after the input of the information about the peripheral device is completed, the controller 140 may match the information about each of the peripheral devices with each of the connectors, and thus, may store the result in the storage 150.

For example, as illustrated in FIG. 5, after the user operation for inputting information about the peripheral device is input, a list 410 of a D-sub, a DVI, a component, and an S-Video provided in the electronic apparatus 400 may be displayed. If the DVI is selected, a user interface window 420 in which a brand name, a model name and a product serial number of a peripheral device that is connected to or will be connected to the DVI can be input is displayed. After that, if the user inputs all information about the peripheral device such as "SAMSUNG", "DVD-D530", and "AX5112K" and selects a "confirm" button, the electronic apparatus 400 displays a completion message, and matches the input information about the peripheral device with the DVI, thereby storing the result.

Figure 6:
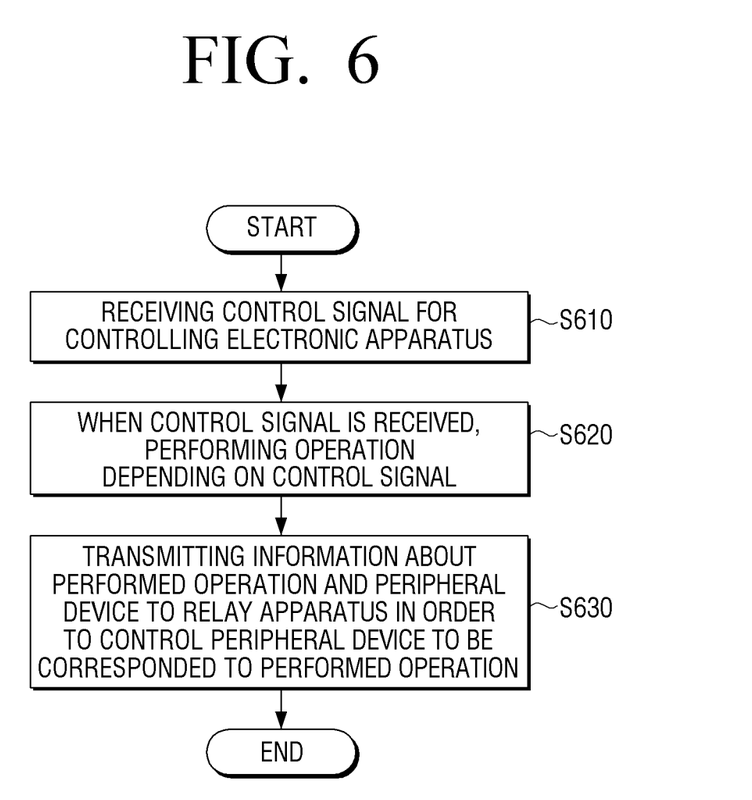
FIG. 6 is a flowchart for explaining a control method of an electronic apparatus that controls peripheral devices by using a relay apparatus according to an exemplary embodiment of the present disclosure.

FIG. 6 is a flowchart for explaining a control method of an electronic apparatus that controls peripheral devices by using a relay apparatus according to an exemplary embodiment of the present disclosure.

First, a control signal for controlling an electronic apparatus is received (operation S610).

After that, after the control signal is received, the electronic apparatus performs an operation depending on the control signal (operation S620), and transmits information about the performed operation and information about a peripheral device to a relay apparatus in order to control the peripheral device to perform an operation that be corresponds to the operation performed by the electronic apparatus (operation S630). Here, the information about the peripheral device may include at least one of a brand name, a model name, and a product serial number of the peripheral device.

On the other hand, the electronic apparatus according to an exemplary embodiment of the present disclosure may include at least one connector to be connected to at least one peripheral device. In this case, the electronic apparatus may store information about the peripheral device matched by the connector, and, if a control signal is received, may determine to which connector the peripheral device is connected, and may transmit the information about the peripheral device matched with the connector to which the peripheral device is connected to the relay apparatus.

In detail, if the control signal includes a power off command for turning off the power of the electronic apparatus, the electronic apparatus may turn off its own power depending on the power off command, and may transmit information about the power off operation that was performed in the electronic apparatus to the relay apparatus in order to turn off the power of the peripheral device through the relay apparatus. Accordingly, the relay apparatus may generate a control signal for turning off the power of the peripheral device based on the information about the peripheral device and the information about the power off operation, and thus, may transmit the control signal to the peripheral device.

Also, if the control signal includes an external input switch command for displaying an external input signal being received from the peripheral device on the electronic apparatus, the electronic apparatus may output the external input signal being input from the peripheral device depending on the external input switch command, and may transmit information about the external input switch that was performed in the electronic apparatus to the relay apparatus in order to turn on the power of the peripheral device through the relay apparatus. Accordingly, the relay apparatus may generate a control signal for turning on the power of the peripheral device based on the information about the peripheral device and the information about the external input switch, and thus, may transmit the control signal to the peripheral device.

According to an exemplary embodiment of the present disclosure as described above, the electronic apparatus performs an operation corresponding to the received control signal, and transmits information about the performed operation and information about the peripheral device to the relay apparatus. Then, the relay apparatus generates a control signal for controlling the peripheral device based on the information about the performed operation and the information about the peripheral device, and thus, transmits the control signal to the peripheral device. Accordingly, since the user can control the peripheral device by only one operation for controlling the electronic apparatus, user convenience may be improved.

Also, a non-transitory computer-readable medium in which a program to sequentially perform a control method of an electronic apparatus according to an exemplary embodiment of the present disclosure is stored may be provided.

The non-transitory computer-readable medium means not a medium to store data for a short moment like a register, a cache, a memory, etc., but a medium that can store data in a semi-permanent state, and can be read by devices. Specifically, the various applications or programs as described above may be stored in the non-transitory computer readable medium, such as a CD, a DVD, a hard disc, a Blu-ray disc, an USB, a memory card, a ROM, etc.

Also, a bus is not illustrated in the block diagram illustrating the display apparatus. However, communication between components of the display apparatus may be performed through the bus. In addition, the display apparatus may include a processor, such as a central processing unit (CPU), a microprocessor, etc., that performs a variety of steps as described above.

While the exemplary embodiments of the present disclosure have been described, additional variations and modifications of the exemplary embodiments may occur to those skilled in the art once they learn of the basic inventive concepts. Therefore, it is intended that the appended claims shall be construed to include both the above exemplary embodiments and all such variations and modifications that fall within the spirit and scope of the inventive concepts.

What is claimed is:

1. An electronic apparatus that controls at least one peripheral device by using a relay apparatus, the electronic apparatus comprising:

an interface which is connected to a plurality of peripheral devices;
a storage which stores information regarding the plurality of peripheral devices,
a communication unit which performs communication with the relay apparatus;
a receiver which receives a control signal for controlling the electronic apparatus; and
a controller which, when the control signal is received, performs an operation based on the control signal, determines the at least one peripheral device, to be controlled according to the performed operation, among the plurality of peripheral devices based on the information regarding the plurality of peripheral devices, and controls the communication unit to transmit information regarding the performed operation and information regarding the at least one peripheral device to the relay apparatus,
wherein the relay apparatus determines an operation to be performed by the at least one peripheral device according to the performed operation based on the information regarding the performed operation, generates a control signal for controlling the at least one peripheral device to perform the determined operation based on the information regarding the at least one peripheral device, and transmits the generated control signal to the at least one peripheral device.

2. The electronic apparatus of claim 1, wherein the interface comprises at least one connector that is connected to the at least one peripheral device.

3. The electronic apparatus of claim 2, further comprising:
a storage which stores the information regarding the at least one peripheral device matched with the at least one connector,
wherein, when the control signal is received, the controller controls to transmit the information regarding the at least one peripheral device matched with the connector to which the at least one peripheral device is connected to the relay apparatus.

4. The electronic apparatus of claim 1, wherein the information regarding the at least one peripheral device comprises at least one of a brand name, a model name, and a product serial number of the at least one peripheral device.

5. The electronic apparatus of claim 1, wherein
the control signal comprises a power off command for turning off power of the electronic apparatus, and
the controller turns off the power of the electronic apparatus depending on the power off command, and controls to transmit information regarding the power off operation that was performed in the electronic apparatus to the relay apparatus in order to turn off the power of the at least one peripheral device through the relay apparatus.

6. The electronic apparatus of claim 5, wherein
the relay apparatus generates a control signal for turning off the power of the at least one peripheral device based on the information regarding the plurality of peripheral devices and the information regarding the power off operation, and transmits the control signal to the at least one peripheral device.

7. The electronic apparatus of claim 1, wherein
the control signal comprises an external input switch command for outputting an external input signal received from the at least one peripheral device in the electronic apparatus, and
the controller controls to output the external input signal received from the at least one peripheral device based on the external input switch command, and controls to transmit information regarding the external input switch that was performed in the electronic apparatus to the relay apparatus in order to turn on the power of the at least one peripheral device through the relay apparatus.

8. The electronic apparatus of claim 7, wherein
the relay apparatus generates a control signal for turning on the power of the at least one peripheral device based on the information regarding the plurality of peripheral devices and the information regarding the external input switch, and transmits the control signal to the at least one peripheral device.

9. A control method of an electronic apparatus that controls at least one peripheral device by using a relay apparatus, the control method comprising:
storing information regarding a plurality of peripheral devices connected to an interface;
receiving a control signal for controlling the electronic apparatus;
after the control signal is received, performing an operation based on the control signal;
determining the at least one peripheral device, to be controlled according to the performed operation, among the plurality of peripheral devices based on the information regarding the plurality of peripheral devices; and
transmitting information regarding the performed operation and information regarding the at least one peripheral device to the relay apparatus,
wherein the relay apparatus determines an operation to be performed by the at least one peripheral device according to the performed operation based on the information regarding the performed operation, generates a control signal for controlling the at least one peripheral device to perform the determined operation based on the information regarding the at least one peripheral device, and transmits the generated control signal to the at least one peripheral device.

10. The control method of claim 9, wherein
the electronic apparatus comprises at least one connector that is connected to the at least one peripheral device.

11. The control method of claim 10, further comprising:
storing information regarding the at least one peripheral device matched with the at least one connector,
wherein, when the control signal is received, the transmitting information comprises,
determining a connector to which the at least one peripheral device is connected; and
transmitting the information regarding the at least one peripheral device matched with the connector to which the at least one peripheral device is connected to the relay apparatus.

12. The control method of claim 9, wherein
the information regarding the plurality of peripheral devices comprises at least one of a brand name, a model name, and a product serial number of the at least one peripheral device.

13. The control method of claim 9, wherein
the control signal comprises a power off command for turning off the power of the electronic apparatus,
the performing an operation comprises turning off the power of the electronic apparatus based on the power off command, and
the transmitting information comprises transmitting information regarding the power off operation that was performed in the electronic apparatus to the relay apparatus in order to turn off the power of the at least one peripheral device through the relay apparatus.

14. The control method of claim 13, wherein
the relay apparatus generates a control signal for turning off the power of the at least one peripheral device based on the information regarding the at least one peripheral device and the information regarding the power off operation, and thus, the relay apparatus transmits the control signal to the at least one peripheral device.

15. The control method of claim 9, wherein
the control signal comprises an external input switch command for displaying an external input signal received from the at least one peripheral device in the electronic apparatus,
the performing operation comprises outputting the external input signal being input from the at least one peripheral device based on the external input switch command, and
the transmitting information comprises transmitting information regarding the external input switch that was performed in the electronic apparatus to the relay apparatus in order to turn on the power of the at least one peripheral device through the relay apparatus.

16. The control method of claim 15, wherein
the relay apparatus generates a control signal for turning on the power of the at least one peripheral device based on the information regarding the at least one peripheral device and the information regarding the external input switch, and thus, the relay apparatus transmits the control signal to the at least one peripheral device.

17. A system comprising:
a relay apparatus;
a storage which stores information regarding a plurality of peripheral devices connected to an interface; and
an electronic apparatus that controls a peripheral device by using the relay apparatus,
wherein, when a control signal for controlling the electronic apparatus is received, the electronic apparatus performs an operation based on the control signal, determines at least one peripheral device, to be controlled according to the performed operation, among the plurality of peripheral devices based on the information regarding the plurality of peripheral devices, and transmits information regarding the performed operation and information regarding the peripheral device to the relay apparatus,
wherein the relay apparatus determines an operation to be performed by the at least one peripheral device according to the performed operation based on the information regarding the performed operation, generates a control signal for controlling the at least one peripheral device to perform the determined operation based on the information regarding the at least one peripheral device, and transmits the generated control signal to the at least one peripheral device.

18. The system of claim 17, wherein
when a control signal for turning off power of the electronic apparatus is received,
the electronic apparatus turns off its own power, and transmits information regarding the power off operation that was performed in the electronic apparatus to the relay apparatus, and
the relay apparatus generates a control signal for turning off power of the at least one peripheral device based on the information regarding the plurality of peripheral devices, and transmits the control signal to the at least one peripheral device.

19. A relay apparatus for controlling an electronic apparatus and at least one peripheral device, the relay apparatus comprising:
a communication unit which receives information about an operation performed in the electronic apparatus and information regarding a plurality of peripheral devices;
a storage which stores control codes to control each of the plurality of peripheral devices;
a controller which determines an operation to be performed by the at least one peripheral device according to the performed operation based on the information regarding the performed operation, and generates a control signal for controlling the at least one peripheral device to perform the determined operation based on the information regarding the at least one peripheral device, and
a transmitter which transmits the generated control signal to the at least one peripheral device, wherein
the electronic apparatus stores information regarding the plurality of peripheral devices and determines the at least one peripheral device, to be controlled according to the performed operation, among the plurality of peripheral devices based on the information regarding the plurality of peripheral devices.

20. The relay apparatus of claim 19, wherein the operation performed in the electronic apparatus is at least one of a power-on operation, a power-off operation, and an external input switch operation.

21. The relay apparatus of claim 19, wherein the information regarding the at least one peripheral device is at least one of a brand name, a model name, and a product serial number.

* * * * *